Patented Mar. 31, 1931

1,798,156

UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO NEWPORT CHEMICAL CORPORATION, A CORPORATION OF DELAWARE

1-AMINO-2-CHLORO-4-HYDROXY ANTHRAQUINONE AND PROCESS OF PREPARING THE SAME

No Drawing.   Application filed February 6, 1928.   Serial No. 252,421.

This invention relates to 1-amino-2-chloro-4-hydroxy anthraquinone and to a process of preparing the same.

It is an object of this invention to provide a simple and economically practical method for preparing 1-amino-2-chloro-4-hydroxy anthraquinone, which is of itself a valuable product and is also used as an intermediate in the preparation of dyestuffs.

In our copending application, Serial No. 178,809, now Patent No. 1,711,146, issued April 30, 1929, we described and claimed the compound 3'-amino-4', 6'-dichloro-ortho-benzoyl-benzoic acid and a process for preparing the same. We have now discovered that 3'-amino-4', 6'-dichloro ortho benzoyl benzoic acid may be converted into 1-amino-2-chloro-4-hydroxy anthraquinone without employing the steps of isolating any of the intermediate reaction products.

In the German Patent No. 203,083, there has been disclosed a method for the preparation of 1-amino-4-hydroxy anthraquinone derivatives by heating the corresponding 1-amino-4-halogen anthraquinone derivative in sulfuric acid or with sulfuric acid containing free sulfur trioxide, either with or without the use of boric acid. The present method makes use of this invention to the extent that in producing the 1-amino-2-chloro-4-hydroxy anthraquinone from the ortho benzoyl benzoic acid derivative there may be formed at first the 1-amino-2, 4-dichloro anthraquinone. Our invention therefore resides in the improvement which enables use to obtain the desired product from the ortho benzoyl benzoic acid without isolating any intermediate compound.

In general, the improved process includes dissolving 3'-amino-4', 6'-dichloro ortho benzoyl benzoic acid in concentrated sulfuric acid or in concentrated sulfuric acid containing free sulfur trioxide, as for example, weak oleum, and heating the same to about 140 to 160° C. to effect ring closing. Boric acid is then added and the mass is heated to about 200° C. to complete the hydrolysis of the chlorine group in the 4-position, that is, replacing it by an hydroxyl group. The reactions involved in this process are most probably best expressed by the following chemical equations:

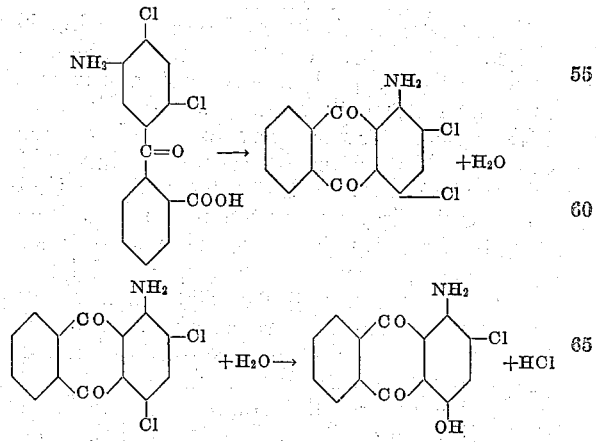

These reactions although represented as taking place in separate steps, probably take place concurrently in the reaction mass.

1-amino-2-chloro-4-hydroxy anthraquinone is a crystalline solid obtained in the form of dark red shining needles when recrystallized from glacial acetic acid. Upon repeated crystallization from acetic acid or alcohol the melting point of the compound could not be raised above 228 to 230° C. It is easily soluble in hot glacial acetic acid, less soluble in alcohol and cold acetic acid. It is fairly soluble in hot water, but less soluble in cold water. It is only slightly soluble in dilute caustic soda solution imparting thereto a reddish color.

Without limiting our invention to any particular procedure, the following example, in which parts by weight are given, will serve to illustrate our method in its preferred form.

310 parts of 3'-amino-4', 6'-dichloro ortho benzoyl benzoic acid are dissolved in 1550 parts of sulfuric acid (monohydrate). The solution is then heated to 150 to 160° C. and kept at this temperature for 15 to 20 minutes. 110 parts of boric acid are now added, and the mass further heated to about 200° C. It is held at this temperature until the evolution of hydrochloric acid gas has practically ceased, or about 2 to 3 hours. The mass is then cooled to about 100° C. and there are then added, keeping the temperature below 100° C., 1700 parts of cold water over a period of about 2 hours. The diluted mass is poured into 2000 parts of water and agitated until cold. The 1-amino-2-chloro-4-hydroxy anthraquinone separates and is filtered off.

Although the above example represents the embodiment of our preferred method, variations in the above method of procedure are possible without greatly affecting the results. For instance, sulfuric acid of lower concentration, say 93%, may be used and the boric acid may be added to the reaction mass before heating up, or it may be omitted. The omission of the boric acid, however, is not to be preferred.

An important feature of our invention is the combination of the two reaction steps to produce the desired product without isolating the intermediate compounds formed, which means fewer operations and greater economy in the use of raw materials. It will be understood that the two reaction steps, which in any event take place more or less concurrently in the reaction mass, may be carried out by continuous gradual heating of the mass to 140 to 200° C. actually holding the temperature at 150 to 160° C. for a sufficient period of time to complete the preliminary step of ring closing.

We are aware that numerous details of the process may be varied through a wide range without departing from the principles of this invention, and we, therefore, do not purpose limiting the patent granted hereon otherwise than necessitated by the prior art.

We claim as our invention:

1. As a new article of manufacture, 1-amino-2-chloro-4-hydroxy anthraquinone, having most probably the following formula:

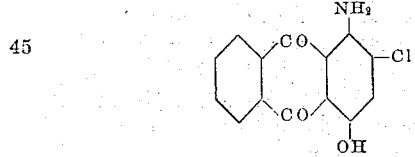

2. In the process of preparing 1-amino-2-chloro-4-hydroxy anthraquinone, the steps of heating 1-amino-2, 4-dichloro anthraquinone in concentrated sulphuric acid in the presence of boric acid to a temperature of between 140 and 200° C. and maintaining the reaction mass within that temperature range until evolution of hydrochloric acid gas has practically ceased.

3. In the process of preparing 1-amino-2-chloro-4-hydroxy anthraquinone, the steps of further heating a reaction mass resulting from the heating of 3'-amino-4', 6'-dichloro-ortho-benzoyl benzoic acid with concentrated sulphuric acid and containing 1-amino-2, 4-dichloro anthraquinone to a temperature of between 140 and 200° C. and maintaining the mass within that temperature range until evolution of hydrochloric acid gas has practically ceased.

In testimony whereof we have hereunto subscribed our names at Carrollville, Milwaukee County, Wisconsin.

IVAN GUBELMANN.
HENRY J. WEILAND.
OTTO STALLMANN.